M. H. HART.
METHOD OF SOIL CULTIVATION.
APPLICATION FILED AUG. 12, 1918.

1,302,543.

Patented May 6, 1919.

WITNESSES
R A Balderson
Jesse B. Heller

INVENTOR
M. H. Hart

UNITED STATES PATENT OFFICE.

MILLER H. HART, OF PITTSBURGH, PENNSYLVANIA.

METHOD OF SOIL CULTIVATION.

1,302,543.              Specification of Letters Patent.         Patented May 6, 1919.

Application filed August 12, 1918. Serial No. 249,432.

*To all whom it may concern:*

Be it known that I, MILLER H. HART, a citizen of the United States, residing at Pittsburgh, in the county of Allegheny and State of Pennsylvania, have invented a new and useful Improvement in Methods of Soil Cultivation, of which the following is a full, clear, and exact description, reference being had to the accompanying drawings, forming part of this specification, in which.

My invention has relation to a novel method of tilling or cultivating the soil for the purpose of producing an increased crop yield.

My invention provides a method which can be readily put into practice by a farmer and by means of which the crop product may be materially increased.

Figure 1:
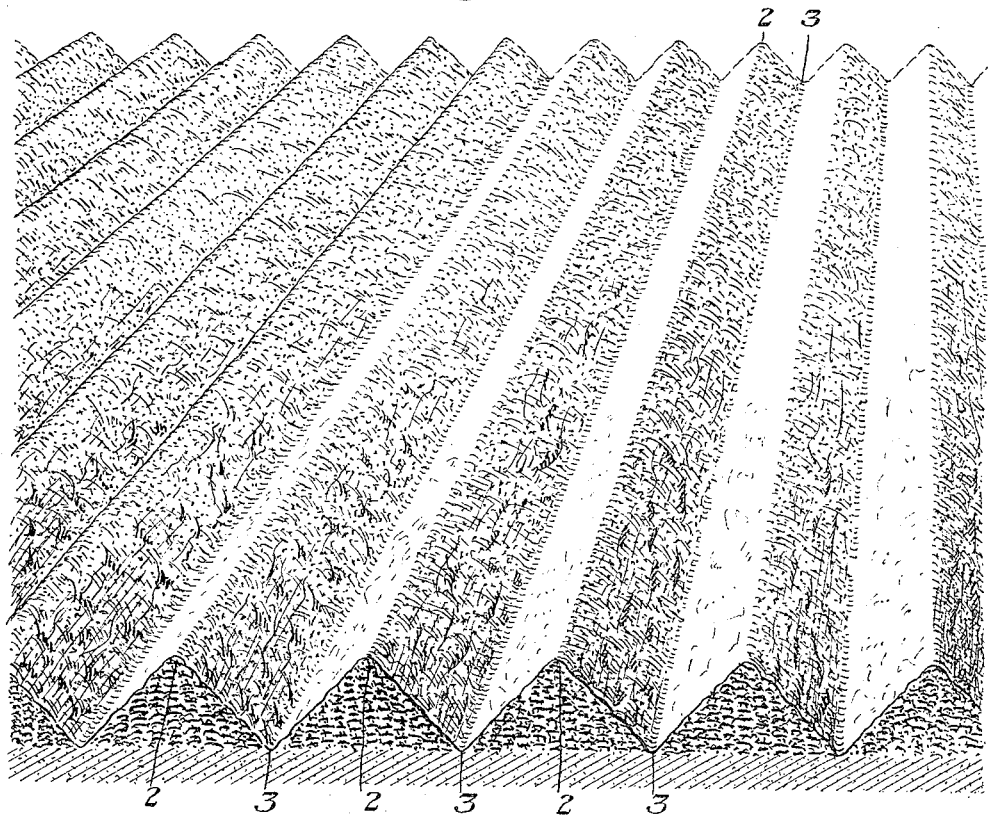
Figure 1 is a perspective view illustrative of my method.
Figure 2:
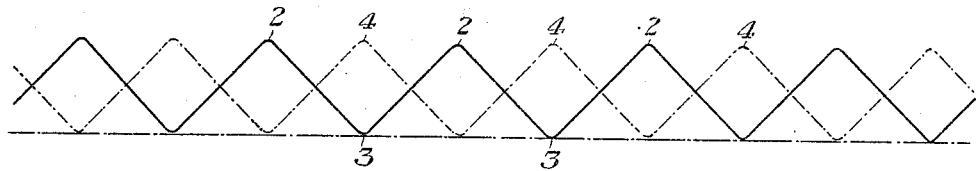
Fig. 2 is a diagrammatic view of the same and also showing another step of the method.

In carrying out my invention I first break the soil in the usual manner by plowing. After this is done the ground is first cultivated to throw it into substantially alternating furrows and ridges, such as indicated at 2 and 3 in Figs. 1 and 2. This may be done by any suitable implement, such as a shovel-plow. Preferably the sloping sides of the ridges are approximately at an angle of 45°. I have obtained good results when the ridges are 6 inches in height. Preferably this cultivation takes place at a time when the weather is dry and the temperature in the shade is 70° Fahrenheit, or above. After the soil has been ridged in this manner it is allowed to lie in this shape for some three or four days, until the exposed surfaces of the ridges are thoroughly dry. The length of time required to accomplish this depends very considerably upon the state of the weather and the season of the year. After this drying has taken place, I make a second cultivation by splitting each of the ridges in two as near the center as may be, throwing the soil in opposite directions, and forming new ridges, such as indicated at 4 in dotted lines in Fig. 2, the center of these ridges occupying approximately the positions occupied by the bottoms of the furrows in the first ridging operation. This second cultivation will act, therefore, to expose any moist soil in the original ridges to the drying process, since it throws the dry soil on the outside of the front ridges inwardly and brings the soil in the central portion of the first ridges to the surface portions of the new ridges.

If the soil is not initially dry, this plan of cultivation will not only dry it, but puts it in excellent temper or "tilt" for planting.

When the soil has become properly dry it is in condition for planting, and may first be leveled off by a harrow or other suitable implement if desired.

I have found that the best results are obtained when the ridges and furrows run as near north and south as may be, so that the rays of the sun will strike the sides of the ridges at substantially right angles, producing a minimum heating effect at nine o'clock in the morning and a maximum heating effect at three o'clock in the afternoon. The effect of this ridging is to develop a very considerable degree of heat in the sloping surfaces of the ridges, due to the action of the sun. With the temperature in the shade from 70 to 80° Fahrenheit, I have been able to produce temperatures in the sides of these ridges when exposed to the sun of from 110 to 120° Fahrenheit. A maximum temperature of 80° Fahrenheit produced in these furrows in this manner will produce good results; and the beneficial results increase as the temperature thus produced increases.

The effect of this heat is not only to dry and temper the soil, but it results in the fixation in the soil of nitrogen from the air, as has been proven by actual soil tests. Thorough tests of my improved system have demonstrated the fact that when soil is treated in accordance herewith, greatly increased production results.

My improved method may be applied to farming generally or to gardens, lawns and parks, as the soil responds to this treatment no matter for what purpose it may be used. For small plots hand power may be used, as the ridging may be effected with a hoe. Lawns or parks should preferably be spaded up or plowed-under preliminary to this treatment when the weather is dry, as at this time the vegetation on them can be more thoroughly eradicated and this is necessary for the most successful results.

The treatment also destroys grubs and other insects and cures the cold, sour condition which is frequently present in soils, especially where the ground has not been cultivated for a considerable period of time.

Good results are obtained when the treatment does not extend to a depth more than two or three inches below the original surface of the soil.

I claim:

1. The herein described method of soil cultivation, which consists in breaking the soil and then cultivating it to form it into a series of substantially parallel ridges, allowing the soil to dry while in this ridged condition, and then splitting the original ridges and forming new ridges the centers of which occupy approximately the positions occupied by the bottoms of the furrows between the original ridges; substantially as described.

2. The herein described method of soil cultivation, which consists in first breaking the soil, second forming the same into a plurality of substantially parallel ridges extending in a generally north and south direction, allowing the soil to dry while so ridged, then splitting the original ridges to form new ridges whose centers occupy approximately the positions occupied by the bottoms of the furrows between the initial ridges, and allowing the soil to further dry while thus ridged and preparatory to planting the same; substantially as described.

3. The herein described method of soil cultivation, which consists in breaking the soil, forming it into a series of substantially parallel ridges having sides which slope at an angle of approximately 45° and which extend in a generally north and south direction, and allowing the soil to dry while in such ridged condition, then splitting the original ridges and forming new ridges alternating in position with the first ridges, allowing the soil to further dry while in this ridged condition, and then planting the same; substantially as described.

In testimony whereof, I have hereunto set my hand.

MILLER H. HART.

Copies of this patent may be obtained for five cents each, by addressing the "Commissioner of Patents, Washington, D. C."